US012490362B1

(12) United States Patent
Shao

(10) Patent No.: US 12,490,362 B1
(45) Date of Patent: Dec. 2, 2025

(54) MULTI-MODULATION STRING LIGHT

(71) Applicant: Shu-Fa Shao, New Taipei (TW)

(72) Inventor: Shu-Fa Shao, New Taipei (TW)

(*) Notice: Subject to any disclaimer, the term of this patent is extended or adjusted under 35 U.S.C. 154(b) by 0 days.

(21) Appl. No.: 19/308,871

(22) Filed: Aug. 25, 2025

(51) Int. Cl.
*H05B 47/155* (2020.01)
*H05B 45/325* (2020.01)
*H05B 47/16* (2020.01)
*H05B 47/19* (2020.01)

(52) U.S. Cl.
CPC ........ *H05B 47/155* (2020.01); *H05B 45/325* (2020.01); *H05B 47/16* (2020.01); *H05B 47/19* (2020.01)

(58) Field of Classification Search
CPC .... H05B 47/155; H05B 45/325; H05B 47/16; H05B 47/19
See application file for complete search history.

(56) References Cited

U.S. PATENT DOCUMENTS

2023/0074671 A1* 3/2023 Woytowitz ........... H05B 45/382

FOREIGN PATENT DOCUMENTS

| CN | 216531846 U | * | 5/2022 | ............ H05B 44/00 |
| JP | 2021520867 A | * | 8/2021 | ............ G16H 20/40 |

* cited by examiner

*Primary Examiner* — Abdullah A Riyami
*Assistant Examiner* — Syed M Kaiser
(74) *Attorney, Agent, or Firm* — United One Law Group LLC; Kongsik Kim; Jhongwoo Peck

(57) ABSTRACT

A multi-modulation string light includes a control module, a first light emitting diode (LED), and a light emitting component. The control module is configured to combine a communication command signal, a reset signal, and a drive signal to generate a composite signal and output the composite signal to a first wire and a second wire. The light emitting component includes an LED set, a first control chip, and a second control chip. The first control chip is configured to drive the first LED according to the communication command signal. The second control chip is configured to drive the LED set according to the drive signal and a preset control timing. The control module may determine whether the composite signal meets a signal condition, and selectively control the second control chip to perform a light emission mode in place of the first control chip.

10 Claims, 10 Drawing Sheets

MULTI-MODULATION STRING LIGHT

CROSS-REFERENCE TO RELATED APPLICATION

This application claims priority from Chinese Application No. 202511069420.X filed on Jul. 31, 2025, which is incorporated herein by reference in its entirety.

BACKGROUND

1. Technical Field

The present invention discloses a multi-modulation string light, and in particular, to a multi-modulation string light of a light emitting component where a light emitting diode (LED) is arranged on two wires of the string light and the LED is controlled to flicker or turn off to achieve varied lighting effects.

2. Related Art

Currently, control of a string light is an operation of controlling a light emitting diode (LED) to emit light through a drive signal. However, the current control manner can only perform simple control on the LED, and cannot meet visual requirements of users for changes in the string light.

SUMMARY

In view of this, a multi-modulation string light is provided, including a first wire, a second wire, a control module, a first light emitting diode (LED), and a light emitting component. The control module is configured to combine a communication command signal, a reset signal, and a drive signal to generate a composite signal and output the composite signal to the first wire and the second wire. The first LED is connected in parallel between the first wire and the second wire, and is configured to generate first light based on the composite signal. The light emitting component is connected in parallel between the first wire and the second wire. The light emitting component includes an LED set, a first control chip, and a second control chip. The LED set is configured to generate modulated light when driven. The first control chip is configured to drive, based on the communication command signal, the LED set to perform a light emission mode. The second control chip is configured to drive the LED set based on the drive signal and preset control timing corresponding to the light emission mode, and reset the preset control timing in response to a low level of the communication command signal or in response to the reset signal. A plurality of low levels of the composite signal within each second meet a signal condition. The signal condition includes: a total time length of the low levels does not exceed a first time threshold, and a quantity of the low levels is not less than 10; or the quantity of the low levels is less than 10, and a time length of each of the low levels is not greater than a second time threshold; and the first time threshold is greater than the second time threshold.

In some embodiments, the control module controls the second control chip to perform the light emission mode in place of the first control chip in response to the plurality of low levels of the composite signal within 1 second not meeting the signal condition.

In some embodiments, the LED set includes a second LED and a third LED. The first control chip drives the second LED, and the second control chip drives the third LED.

In some embodiments, the communication command signal further includes an always-on command and an always-off command, and the control module selectively adds the always-on command and the always-off command to the drive signal at a command frequency to generate the composite signal.

In some embodiments, the LED set includes a second LED, and the second control chip and the third control chip alternately drive the second LED. The control module is selectively configured to: continuously generate the composite signal after generating the communication command signal having a master control command, where the first control chip disables the second control chip based on the master control command; or generate the drive signal after generating the communication command signal having a switching command. The first control chip drives the second LED based on a communication from the second control chip.

In some embodiments, the light emitting component further includes a package. The second LED, the first control chip, and the second control chip are packaged within the package. The package has a first electrical connection terminal and a second electrical connection terminal. The first electrical connection terminal is coupled to the first wire and the first control chip. The second electrical connection terminal is coupled to the second wire and the first control chip. The first control chip is electrically connected to the second LED, and is communicatively connected to the second control chip.

In some embodiments, the LED set includes a second LED, and the second control chip and the third control chip alternately drive the second LED. The control module is selectively configured to: continuously generate the composite signal after generating the communication command signal having a master control command, where the first control chip disables the second control chip based on the master control command; or generate the drive signal after generating the communication command signal having a switching command. The first control chip drives the second LED based on a communication from the second control chip.

In some embodiments, the light emitting component further includes a package. The second LED, the first control chip, and the second control chip are packaged within the package. The package has a first electrical connection terminal and a second electrical connection terminal. The first electrical connection terminal is coupled to the first wire and the first control chip. The second electrical connection terminal is coupled to the second wire and the first control chip. The first control chip is electrically connected to the second LED, and is communicatively connected to the second control chip.

In some embodiments, the light emitting component has a light emission address. The communication command signal has a communication address. The light emitting component generates the modulated light when the light emission address is consistent with the communication address.

In some embodiments, the light emitting component further includes a package. The second LED, the third LED, the first control chip, and the second control chip are packaged within the package. The package has a first electrical connection terminal and a second electrical connection terminal. The first electrical connection terminal is coupled to the first wire and the first control chip. The second electrical connection terminal is coupled to the second wire and the first control chip. The first control chip is communicatively connected to the second control chip. The control module is selectively configured to: generate the composite signal having the reset signal that is intermittently sent; or generate the drive signal after generating the communication command signal having an always-on command.

In some embodiments, when a plurality of first LEDs are arranged, one of the plurality of first LEDs has a first turn-on direction, another of the plurality of first LEDs has a second turn-on direction, and the first turn-on direction is opposite to the second turn-on direction.

In some embodiments, a plurality of light emitting components are arranged. One of the plurality of light emitting components has a first turn-on direction, and another of the plurality of light emitting components has a second turn-on direction. The first turn-on direction is opposite to the second turn-on direction.

In some embodiments, the light emitting component further includes a package. The LED set, the first control chip, and the second control chip are packaged within the package. The package has a first electrical connection terminal and a second electrical connection terminal. The first electrical connection terminal is coupled to the first wire and the first control chip. The second electrical connection terminal is coupled to the second wire and the first control chip. The first control chip is electrically connected to the second control chip and the LED set respectively. In response to the control module sending a switching command, the first control chip drives the second control chip to drive the LED set based on preset control timing.

Based on the above, in the multi-modulation string light of some embodiments, the communication command signal and the reset signal may be selectively added to the drive signal through the control module, to generate a composite signal and output the composite signal to the first wire and the second wire. When an instruction of the communication command signal is too complex to meet the signal condition (the signal condition includes: a total time length of the low levels does not exceed a first time threshold, and a quantity of the low levels is not less than 10; or the quantity of the low levels is less than 10, and a time length of each of the low levels is not greater than a second time threshold), in this case, the control module may control the second control chip to perform the light emission mode in place of the first control chip. For example, the first control chip is controlled to drive a part of the LED set to be always on or always off, and the second control chip is controlled to drive another part of the LED set based on preset control timing corresponding to a specified light emission mode. Accordingly, the first LED may not cause abnormal flickering (for example, the first LED causes irregular flickering or unexpected brightness reduction) as a result of being subject to disturbance of the excessively complex communication command signal.

The present invention is described in detail below with reference to the accompanying drawings and specific embodiments, which are not intended to constitute a limitation on the present invention.

DETAILED DESCRIPTION

Technical solutions of the present invention are described in detail below with reference to the accompanying drawings and specific embodiments, to further understanding objectives, solutions, and effects of the present invention, but are not intended to constitute a limitation on the protection scope of the appended claims of the present invention.

Figure 1:
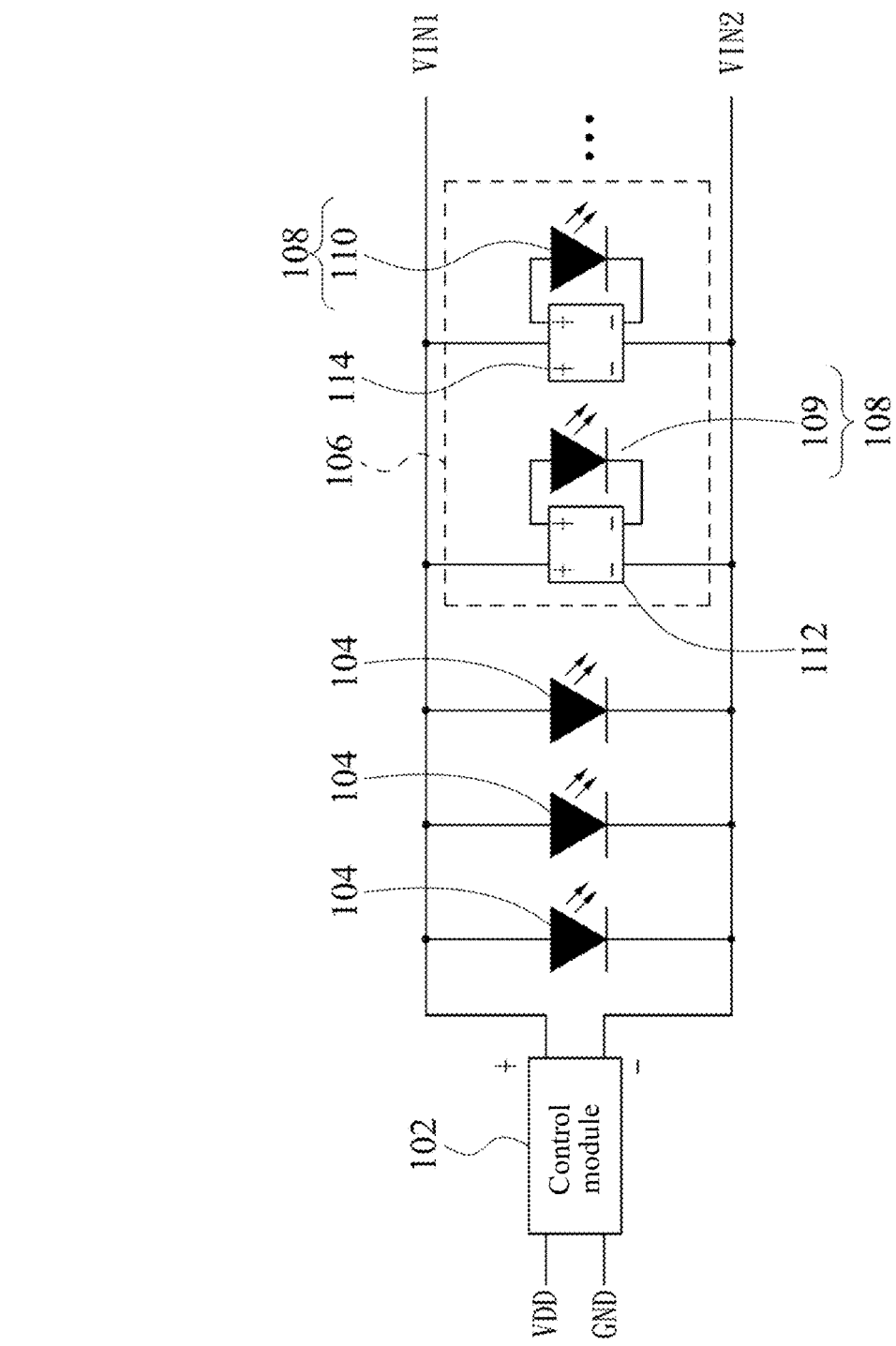
FIG. 1 is a block diagram of a multi-modulation string light according to some embodiments of the present invention.
Figure 2A:
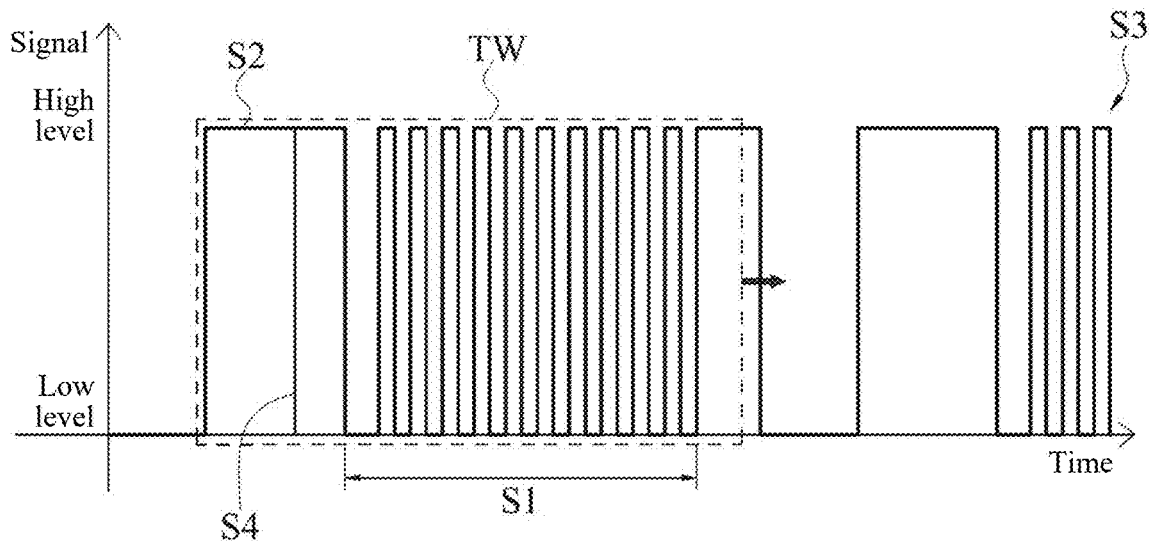
FIG. 2A is a waveform diagram of a composite signal according to some embodiments of the present invention.

As shown in FIG. 1 and FIG. 2A, a multi-modulation string light 100 includes a first wire VIN1, a second wire VIN2, a control module 102, a first light emitting diode (LED) 104, and a light emitting component 106. A control module 102 is configured to selectively combine a communication command signal S1, a drive signal S2, and a reset signal S4 to generate a composite signal S3 and output the composite signal to the first wire VIN1 and the second wire VIN2. The first LED 104 is connected in parallel between the first wire VIN1 and the second wire VIN2, and is configured to generate first light based on the composite signal S3. The light emitting component 106 is connected in parallel between the first wire VIN1 and the second wire VIN2. The light emitting component 106 includes an LED set 108, a first control chip 112, and a second control chip 114. The LED set 108 is configured to generate modulated light when driven. The first control chip 112 is configured to drive, based on the communication command signal S1, the LED set 108 to perform a light emission mode. The second control chip 114 is configured to drive the LED set 108 based on the drive signal S2 and preset control timing CT (see FIG. 5A) corresponding to the light emission mode, and reset the preset control timing CT in response to a low level of a communication command signal S1 or the reset signal S4. A plurality of low levels of the composite signal S3 within each second meet a signal condition. The signal condition includes: a total time length of the low levels does not exceed a first time threshold, and a quantity of the low levels is not less than 10; or the quantity of the low levels is less than 10, and a time length of each of the low levels is not greater than a second time threshold. The first time threshold is greater than the second time threshold.

The control module 102 may be connected to a power supply to obtain an input voltage from the power supply. For example, in FIG. 1, the control module 102 has a first input terminal VDD and a second input terminal GND. A potential difference is defined between the first input terminal VDD and the second input terminal GND, which allows operation of the control module 102, the first LED 104, and the LED set 108.

In some embodiments, after the first wire VIN1 and the second wire VIN2 are connected to the control module 102, the first input terminal VDD and the second input terminal GND respectively generate a high potential and a low potential. This may mean that the first input terminal VDD receives a high potential (an operating voltage), and the second input terminal GND receives a low potential (a grounding voltage). Alternatively, the first input terminal VDD receives a low potential, and the second input terminal GND receives a high potential.

In some embodiments, the first wire VIN1 is parallel to the second wire VIN2. The first LED 104 and the light emitting component 106 are respectively coupled between the first wire VIN1 and the second wire VIN2, to form a long strip-shaped string light structure. Furthermore, the control module 102 sends a composite signal S3 through the first wire VIN1 and the second wire VIN2, to control the first LED 104 and the LED set 108 to emit light or turn off.

The control module 102 may be, for example, a circuit combination such as a central processing unit (CPU), a microcontroller unit (MCU), a digital signal processor (DSP), and an application specific integrated circuit (ASIC) that can output the foregoing composite signal S3. The control module 102 may trigger, based on a high level and a low level, a time point at which the first LED 104 and the light emitting component 106 generate first light or modulated light. For example, when the composite signal S3 is at a high level, the first LED 104 and the LED set 108 are respectively connected to two wires (VIN1, VIN2) to emit light. Alternatively, for example, when the composite signal S3 is at a low level, the first LED 104 and the LED set 108 are not respectively connected to the two wires (VIN1, VIN2) and do not emit light.

In some embodiments, the foregoing description "a plurality of low levels of the composite signal S3 within each second meet a signal condition. The signal condition includes: a total time length of the low levels does not exceed a first time threshold, and a quantity of the low levels is not less than 10; or the quantity of the low levels is less than 10, and a time length of each of the low levels is not greater than a second time threshold" may mean that the control module 102 determines whether the composite signal S3 meets the signal condition every 1 second. The first time threshold may be in a range of 0.2 seconds to 0.4 seconds. The second time threshold may be in a range of 20 milliseconds to 30 milliseconds. It should be noted that the ranges of the first time threshold and the second time threshold may be determined based on a different feel of each human eye for a brightness change, so as to determine the time length. An example in which the first time threshold is 0.3 seconds and the second time threshold is 30 milliseconds is used below. This threshold selection range is suitable for sensitivity of most human eyes, and may also be adjusted based on product requirements, which is not limited to this example value. For example, as shown in FIG. 2A, 1 second may be a period of instantaneous inspection of a continuous composite signal S3 through a predetermined continuous time window TW. As shown in FIG. 2A, if a quantity of the low levels within the predetermined continuous time window TW is not less than 10 (11 in FIG. 2A), and a total duration of these low levels is less than 0.3 seconds, it indicates that the composite signal S3 captured within the predetermined continuous time window TW meets the signal condition. As shown in FIG. 2B again, the quantity of the low levels within the predetermined continuous time window TW is less than 10 (4 in FIG. 2B), but the time length (t1, t2, t3, t4) of each low level is not greater than 30 milliseconds. The composite signal S3 captured within the predetermined continuous time window TW in FIG. 2B still meets the signal conditions. Based on the foregoing example, if the composite signal S3 captured within the predetermined continuous time window TW meets the signal condition, it indicates that allocation of a plurality of low levels of the composite signal S3 in this section is unlikely to cause irregular flickering of the first light or unexpected brightness reduction. Conversely, if the composite signal S3 does not meet the signal condition, it indicates that the allocation of the plurality of low levels of the composite signal S3 in this section may cause irregular flickering visually or unexpected brightness reduction of the first light.

Based on this, the control module 102 may control the second control chip 114 to perform an expected light emission mode in place of the first control chip 112. Since the second control chip 114 drives a portion of the LED set 108 (such as a third LED 110 described later) in a stored expected light emission mode, the control module 102 may simplify the communication command signal S1 (to be described later), to prevent the low level in the composite signal S3 in some light emission modes from interfering with light emission of the first LED 104.

In some embodiments, the control module 102 may receive a control command, and generate the composite signal S3 based on the control command. The control command may be pre-stored in the control module 102. The control module 102 may access the control command to generate and send the composite signal S3 when driven. The control command may also be sent to the control module 102 by an electronic device (such as a mobile phone, a computer, or a tablet computer with a wireless transmission function) arranged outside the multi-modulation string light 100, so that the control module 102 receives the control commands through a wireless transmission channel and generates and sends the composite signal S3 accordingly. In this way, a user may input the corresponding control command into the electronic device based on the light emission mode to be executed, to remotely adjust a change of the first light or second light.

The first LED 104 and the LED set 108 may be a micro LED, an organic LED (OLED), a quantum dot LED (QLED), a mini LED (Mini LED), and a polymer LED (PLED). The first light or modulated light respectively refers to a light emitting action (presenting a luminous state) generated when the corresponding first LED 104 or the LED set 108 is driven. In some embodiments, the first LED 104 may be arranged between the first wire VIN1 and the second wire VIN2 in a single light emitting color. The first LED may also be arranged between the first wire VIN1 and the second wire VIN2 in sequence in a plurality of light emitting colors, so that the multi-modulation string light 100 generates different visual effects. In some embodiments, a single LED set 108 or a plurality of LED sets may be arranged. The LED set 108 may also be arranged between the first wire VIN1 and the second wire VIN2 in a single light emitting color. The LED set may also be arranged between the first wire VIN1 and the second wire VIN2 in sequence in a plurality of light emitting colors. In some embodiments, the LED set 108 includes a second LED 109 and a third LED 110. The first control chip 112 is coupled to the second LED 109 to control the second LED 109 to generate modulated light. The second control chip 114 is coupled to the third LED 110 to control the third LED 110 to generate modulated light. the light emitting actions of the second LED 109 and the third LED 110 are used to distinguish control actions of the first control chip 112 and the second control chip 114 below.

Figure 2B:
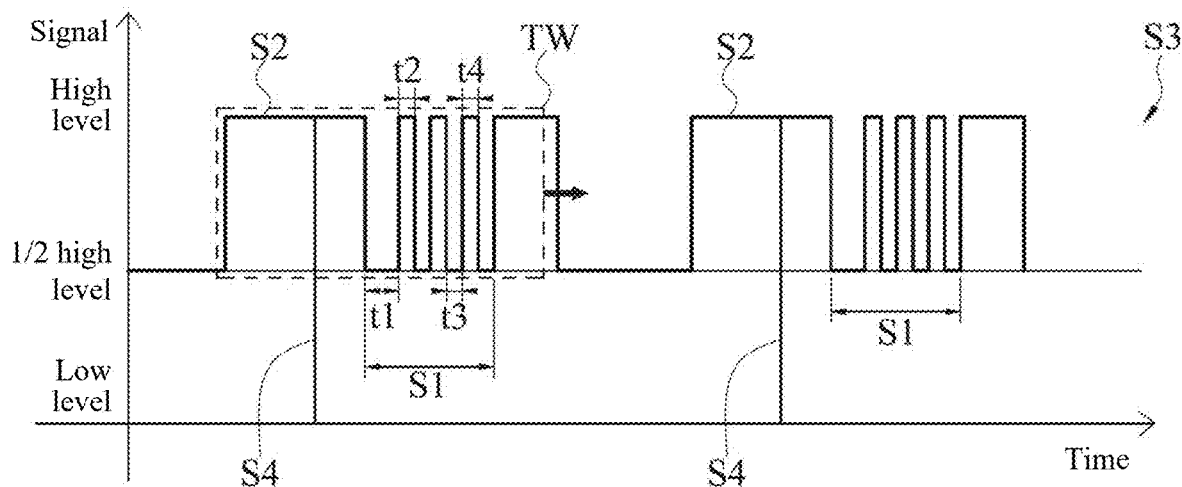
FIG. 2B is a waveform diagram of a composite signal according to some embodiments of the present invention, showing that the composite signal is triggered at ½ high level.

In some embodiments, as shown in FIG. 2A, the drive signal S2 may refer to a combination of a high level or a low level generated on the first wire VIN1 and the second wire VIN2. For example, when the drive signal S2 is at a high level, the first LED 104, the second LED 109, and the third LED 110 may respectively generate first light and modulated light. When the drive signal S2 is at a low level (an input voltage is 0V), the first LED 104, the second LED 109, and the third LED 110 do not generate the first light and the modulated light (which respectively present an off state). In some embodiments, as shown in FIG. 2B, the control module 102 may also set the low level of the composite signal to ½ of the high level. It should be noted that when the communication command signal S1 and the drive signal S2 do not reach the low level, the second control chip 114 is not triggered by the levels (½ of the high level) of the communication command signal S1 and the drive signal S2. Correspondingly, the reset signal S4 is still maintained at a low level, so that the second control chip 114 may successfully reset the preset control timing CT when receiving the reset signal S4.

The first control chip 112 is coupled to the second LED 109, and is configured to drive the second LED 109 based on the communication command signal S1. For example, when the first control chip 112 is maintained at a low level based on the communication command signal S1, the first control chip 112 may control the second LED 109 not to generate the modulated light (to be maintained off). When the first control chip 112 is maintained at a high level based on the communication command signal S1, the first control chip 112 may control the second LED 109 to maintain second light (to be maintained on). It should be noted that since the communication command signal S1 is carried on the drive signal S2, if the first control chip 112 controls, based on the communication command signal S1, the second LED 109 to emit light, and the drive signal S2 is also at a low level at this moment, the second LED 109 does not emit light. Conversely, when the drive signal S2 is at a high level, the second LED 109 emits light. In some embodiments, the first control chip 112 and the second LED 109 may be packaged into a separate light emitting element.

After receiving the drive signal S2, the second control chip 114 may select and specify the preset control timing CT in preset light emission mode to control the third LED 110 to generate modulated light. In some embodiments, the preset light emission mode may be a control program stored in the second control chip 114 to perform the corresponding light emission mode, for example, a flickering mode or a breathing mode (to be described later). For example, in the preset light emission mode, the third LED 110 may generate modulated light based on the changes in the low level and the high level of the preset control timing CT. In some embodiments, the second control chip 114 and the third LED 110 may be packaged into a separate light emitting element.

In some embodiments, different preset light emission modes each have a corresponding preset control timing CT. The control module 102 may drive the second control chip 114 to perform the specified preset control timing CT. For example, the control command may set one preset control mode. The control module 102 may send a corresponding switching command (the switching command may be a code segment of a high level and a low level) based on the specified preset control mode. The second control chip 114 may execute the preset control timing CT of the specified preset control mode after receiving the switching command. The second control chip 114 may reset the preset control timing CT (to be described later) based on a reset signal S4.

In some embodiments, the first control chip 112 may identify the communication command signal S1 and the reset signal S4, so that the first control chip 112 does not drive the second LED 109 with the reset signal S4. Alternatively, even if the first control chip 112 cannot identify the reset signal S4, since the reset signal S4 has a shorter time length than the communication command signal S1, the reset signal S4 also causes no visually perceptible change in the luminous effect of the second LED 109. Therefore, the reset signal S4 does not affect the communication command signal S1. The reset signal S4 may also be a control action of the control module 102 to adjust a voltage drop between the first wire VIN1 and the second wire VIN2 to 0V. Herein, the second control chip 114 is temporarily powered off, so that the second control chip 114 may reset the preset control timing CT. It should be noted that the second control chip 114 is provided with a memory inside. Since the time during which the reset signal S4 cuts off power to the second control chip 114 is shorter than the preset control timing CT required for the memory to clear the specified light emission mode, even if the preset control timing CT during execution is reset, the second control chip 114 can still re-perform the preset control timing CT of the specified light emission mode, and the control module 102 does not need to resend a control command to drive the second control chip 114 to perform the specified light emission mode.

In some embodiments, when the first control chip 112 controls, based on the composite signal S3, the second LED 109 to generate modulated light in a specified light emission mode, the second control chip 114 may control the third LED 110 to remain always on or always off. Conversely, when the second control chip 114 controls the third LED 110 to generate modulated light in a specified light emission mode based on the reset signal S4 and the drive signal S2, the first control chip 112 may control the second LED 109 to remain always on or always off (described in detail later).

As shown in FIG. 1 again, in some embodiments, the light emitting component 106 has a light emission address. The communication command signal S1 has a communication address. The light emitting component 106 generates the modulated light when the light emission address is consistent with the communication address. For example, the multi-modulation string light 100 may be connected in parallel with a single light emitting component 106 or a plurality of light emitting components. Each of the light emitting components 106 has a different light emission address. As shown in FIG. 2A or FIG. 2B, a light emission address of a first light emitting component 106 may be, for example, a first light emission address, and a light emission address of a second light emitting component 106 may be, for example, a modulated light emission address. When the communication address in the communication command signal S1 sent by the control module 102 is the first light emission address, the second LED 109 of the first light emitting component 106 generates modulated light when the first light emission address of the first light emitting component 106 is consistent with the communication address. Conversely, when the modulated light emission address of the second light emitting component 106 is not consistent with the communication address, the second LED 109 of the second light emitting component 106 does not generate the modulated light. In this way, the user may generate a communication command signal S1 with a communication address corresponding to a specified light emission address through the control module 102, and control the second LED 109 of the light emitting component 106 at the specified address to generate the modulated light. In some embodiments, the reset signal S4 does not have an address. The control module 102 may be connected across the second control chip 114 between the first wire VIN1 and the second wire VIN2 to synchronously receive the reset signal S4, to control all third LEDs 110 on the multi-modulation string light 100 to generate the modulated light.

Figure 3:
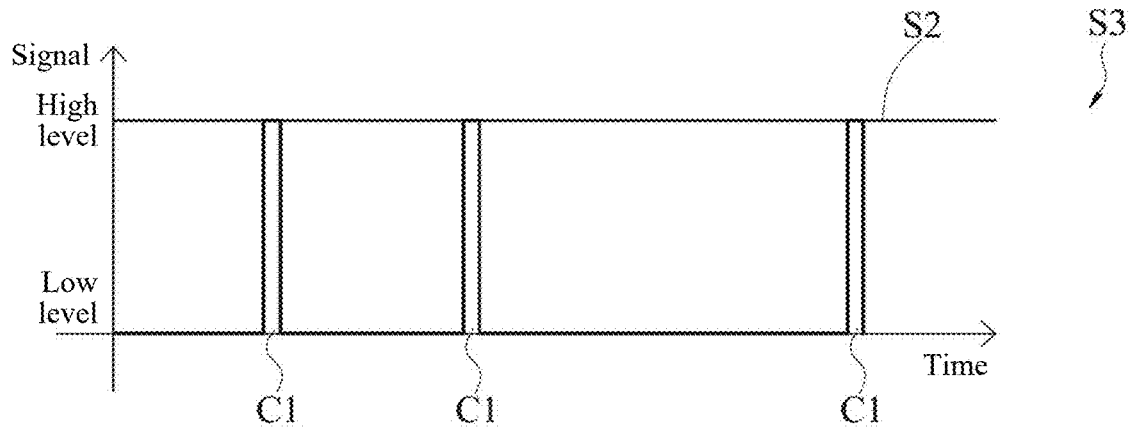
FIG. 3 is a waveform diagram of a composite signal according to some embodiments of the present invention, showing a time point at which an always-on command in a communication command signal is sent.

As shown in FIG. 3, in some embodiments, the communication command signal S1 may include an always-on command C1. The composite signal S3 is a superposition of the always-on command C1 and the drive signal S2. It should be noted that when the communication command signal S1 is the always-on command C1, the first control chip 112 may maintain an output at a high level during the preset light emitting time, so that the second LED 109 continuously emits light during the preset light emitting time. Next, after the preset time ends, the first control chip 112 outputs a low level to turn off the second LED 109. In some embodiments, the control module 102 may add the always-on command C1 to the drive signal S2 at a corresponding command frequency based on a specified light emission mode, to generate the composite signal S3. Accordingly, the second LED 109 may generate the modulated light based on the command frequency. In this embodiment, a period of s low level between two high levels may be the subsequent always-off command C2 (described later in FIG. 4). The command frequency may be shorter than a time at which the human eye can detect a change in light (which may be less than 1/30 seconds). In this way, after the always-on command C1 is added to the drive signal S2, the second LED 109 of the light emitting component 106 may be always on visually, and each first LED 104 is not interfered by the always-on command C1 and also remains always-on.

Figure 4:
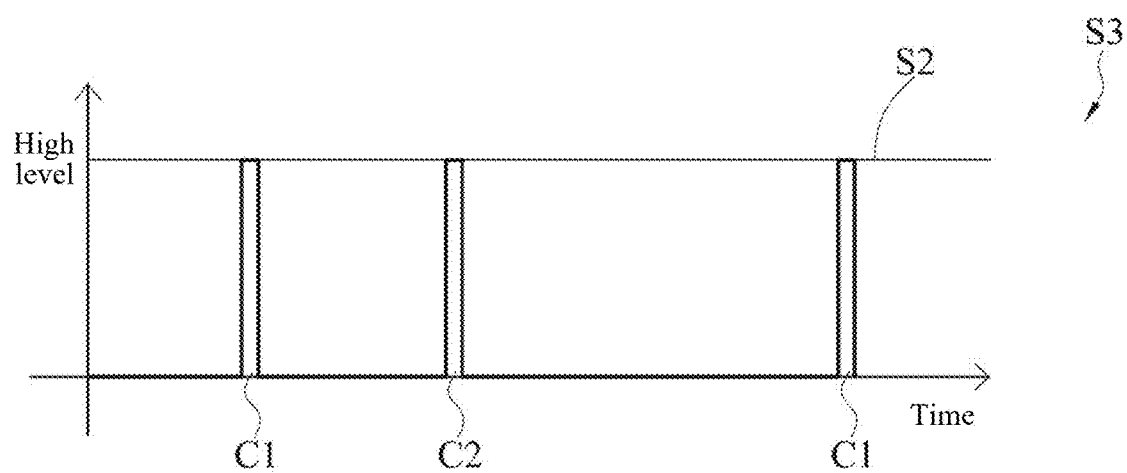
FIG. 4 is a waveform diagram of a composite signal according to some embodiments of the present invention, showing time points at which an always-on command and an always-off command in a communication command signal are sent.

As shown in FIG. 4, in some embodiments, the communication command signal S1 includes an always-on command C1 and an always-off command C2. The first control chip 112 controls the second LED 109 to generate the modulated light based on the always-on command C1, and does not generate the modulated light based on the always-off command C2. As shown in FIG. 4, the control module 102 selectively adds the always-on command C1 and the always-off command C2 to the drive signal S2 at the command frequency, to generate a composite signal S3. For example, when the control module 102 adds the always-on command C1 to the composite signal S3, the first control chip 112 may output a high level based on the always-on command C1 to control the second LED 109 to generate modulated light. The first control chip 112 may control, based on the always-off command C2, the second LED 109 not to generate the modulated light. In some embodiments, when the first control chip 112 executes a star-like flickering mode, the time from the always-on command C1 to the always-off command C2 may be shortened (which is a duration for modulated light), and the time from the always-off command C2 to the always-on command C1 is increased (which is a turn-off duration). Herein, the duration for modulated light is shorter than the turn-off time, to generate a star-like flickering light emission effect. However, the first LED 104 and the third LED 110 may maintain light emission. In some embodiments, the control module 102 may also set the low level of the always-on command C1 and the always-off command C2 to ½ of the high level and maintain the high level unchanged, so that the first control chip 112 may be triggered to output a high level or a low level to control the second LED 109.

Figure 5A:
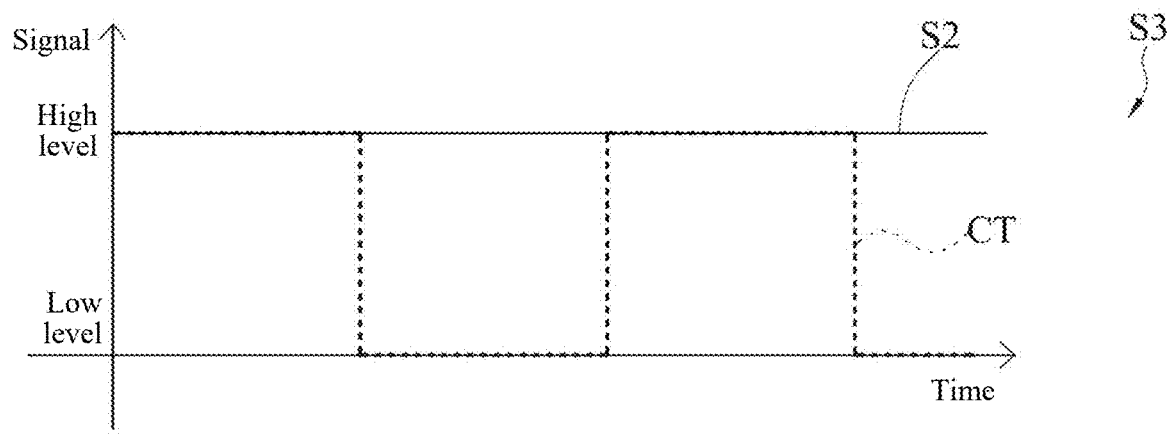
FIG. 5A is a waveform diagram of preset control timing according to some embodiments of the present invention, showing a time point of a reset signal.
Figure 5B:
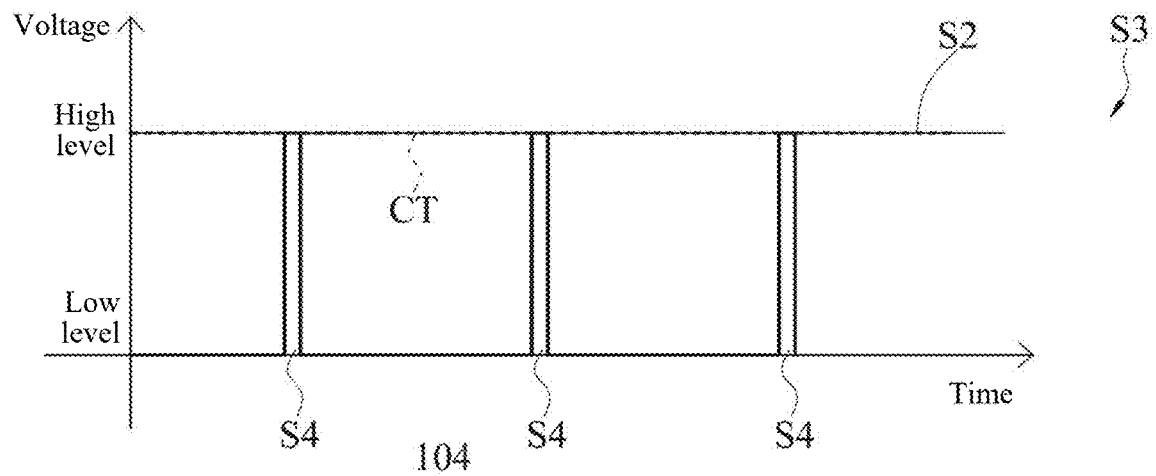
FIG. 5B is a waveform diagram of preset control timing according to some embodiments of the present invention, showing a time point of a reset signal and resetting the preset control timing.

As shown in FIG. 1, FIG. 5A, and FIG. 5B again, in some embodiments, as shown in FIG. 5A, after receiving the drive signal S2, the second control chip 114 drives the third LED 110 to generate modulated light at preset control timing CT based on a specific light emission mode. As shown in FIG. 5B, based on the selected light emission mode, the control module 102 intermittently sends a reset signal S4 within the preset control timing CT (which may be a period during which the preset control timing CT changes from the high level to the low level). The preset control timing CT is continuously reset and maintained at the high level, so that the third LED 110 continuously generates modulated light (that is, the preset control timing CT is maintained at the high level as shown in FIG. 5B). Accordingly, when the drive signal S2 is at a timing M1 (as shown in timing M1 shown in FIG. 6), the first LED 104 and the third LED 110 may generate first light and modulated light, and the second LED 109 may emit light and be turned off based on configuration time of the always-on command C1 and the always-off command C2 in the communication command signal S1, to perform visual effects of different light emission modes. In some embodiments, the reset signal S4 is a low-level signal. The second control chip 114 may reset the preset control timing CT when receiving a low-level signal. In other words, the second control chip 114 may regard the low-level signal in the composite signal S3 as the reset signal S4.

In some embodiments, based on the foregoing control descriptions of the first LED 104, the second LED 109, and the third LED 110, the control module 102 may add the communication command signal S1 and the reset signal S4 to the drive signal S2 based on different light emission modes, to generate a composite signal S3 corresponding to the light emission mode. In some embodiments, the control module 102 may also add the communication command signal S1 and the reset signal S4 to the drive signal S2 based on the control command, to control the second LED 109 and the third LED 110 to simultaneously generate the modulated light.

Figure 6:
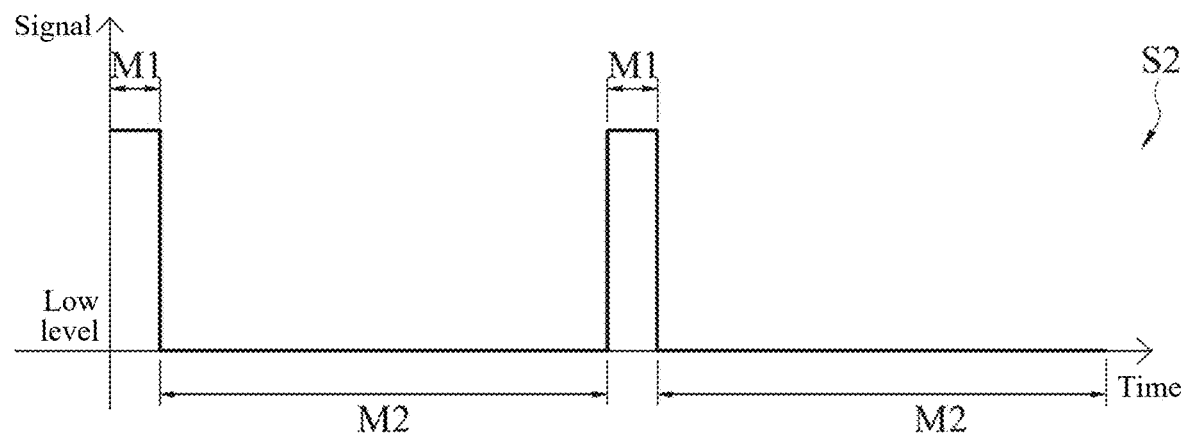
FIG. 6 is a timing control diagram of a drive signal according to some embodiments of the present invention, showing that a timing of a high potential is shorter than a timing of a low potential.
Figure 7:
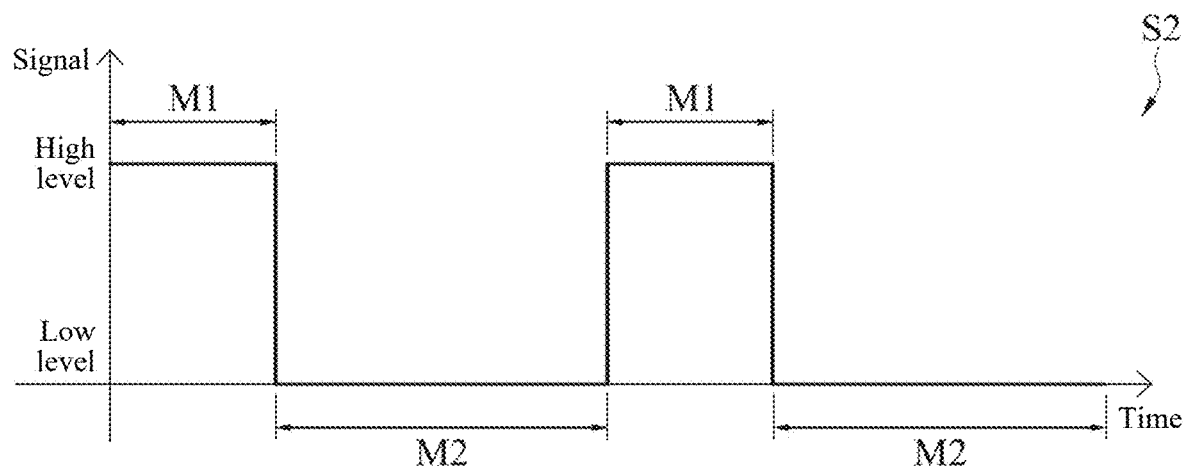
FIG. 7 is a timing control diagram of a drive signal according to some embodiments of the present invention, showing that a timing width of a high potential is less than a timing width of a low potential.
Figure 8:
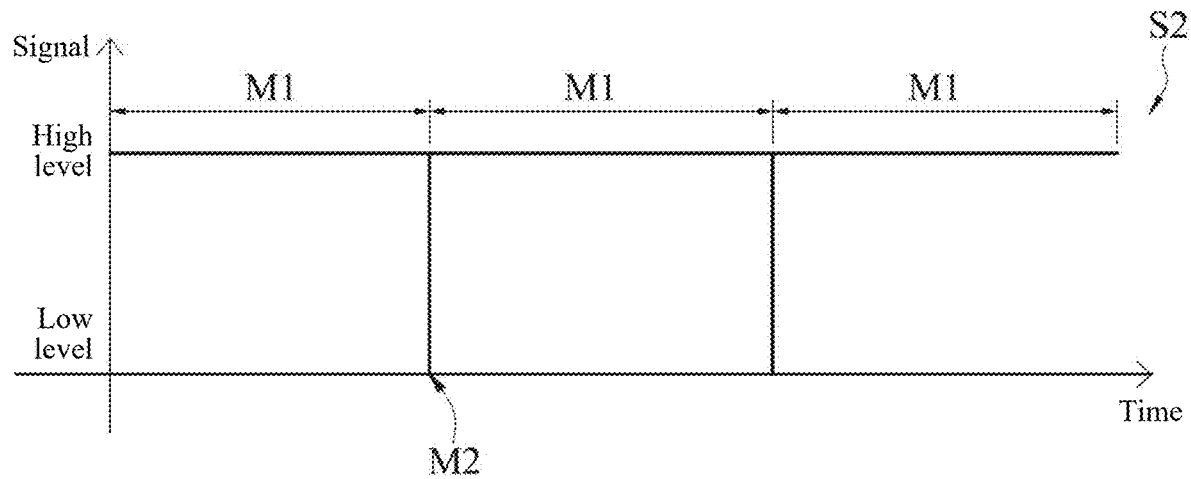
FIG. 8 is a timing control diagram of a drive signal according to some embodiments of the present invention, showing that a timing of a high potential is much greater than a timing of a low potential.

In some embodiments, an example in which the first LED 104, the second LED 109, and the third LED 110 perform the breathing mode is used. The control module 102 may continuously adjust a duty cycle of the communication command signal S1 (as shown in FIG. 6 to FIG. 8), to continuously generate a cyclic change from gradually brightening to gradually dimming of the first light and the modulated light. In this way, each LED (104, 108, 110) can achieve a visual effect of a breathing light. In some embodiments, the control module 102 may also intermittently send a reset signal S4 to drive the third LED 110 to maintain emitting light. In some embodiments, the control module 102 may send the communication command signal S1 before adjusting the duty cycle, so that the first control chip 112 may first perform a specified light emission effect and then adjust brightness.

In some embodiments, the communication command signal S1 and the reset signal S4 are added to the drive signal S2 and sent to the first wire VIN1 and the second wire VIN2 at a frequency of more than 10 ms (milliseconds) per second. A pulse width of the reset signal S4 is set to be greater than 1 microsecond to several milliseconds. Therefore, the impact of the communication command signal S1 and the reset signal S4 on the first LED 104 is less than the time for the human eyes to identify the light emission change, and does not affect the visual effect of the first light. In addition, the control module 102 may adjust time points of the communication command signal S1, the drive signal S2, and the reset signal S4 to perform different light emission modes, for example, timing of the always-on command C1 and/or the always-off command C2 in the communication command signal S1, timing of a high potential and a low potential in the drive signal S2, or sending timing of the reset signal S4.

As shown in FIG. 6, FIG. 7, and FIG. 8, in some embodiments, the drive signal S2 is a pulse width modulation signal. A plurality of first LEDs 104 selectively generate first light based on the pulse width modulation signal. This may mean that when the pulse width modulation signal is at a high level (at timing M1 in FIG. 6), the first LED 104 generates the first light. When the pulse width modulation signal is at a low level (at timing M2 in FIG. 6), the first LED 104 does not generate the first light. In this way, the control module 102 may adjust the pulse width modulation signal to change brightness or light emission timing of the first LED 104. In some embodiments, when the first LED 104 is set to be always on, the control module 102 may continuously update a duty cycle of the pulse width modulation signal, so that the first LED 104 may be visually in a state of continuously emitting light and being always on. FIG. 6 is used as an example again. When a ratio of the timing M1 to the timing M2 is 1/10, first brightness may visually present 10% brightness. FIG. 7 is used as an example. When a ratio of the timing M1 to the timing M2 is ½, second brightness may visually present 50% brightness. FIG. 8 is used as an example. When the timing M1 is much greater than the timing M2, the second brightness may visually present nearly 100% brightness. In some embodiments, the second LED 109 and the third LED 110 may also change the brightness of the second LED 109 by adjusting the duty cycle (the ratio of the timing M1 to the timing M2) of the pulse width modulation signal. The second LED 109 and the third LED 110 also generate corresponding brightness in response to the change in the duty cycle of the pulse width modulation signal. Accordingly, the control module 102 may adjust the duty cycle of the pulse width modulation signal to simultaneously change the brightness changes of gradually brightening and gradually dimming of the first LED 104, the second LED 109, and the third LED 110, so that the LEDs (104, 108, 110) simultaneously perform the visual effect of the breathing light. In addition, the light emission mode further includes candle flickering. The candle flickering may be achieved by adjusting the brightness of modulated light to gradually change quickly, to form an effect like candle-light flickering. The foregoing unexpected decrease in brightness of the first light may mean a situation where the brightness of the first LED 104 is not adjusted by adjusting the duty cycle of the pulse width modulation signal, but is caused by abnormal light (abnormal flickering or reduced brightness) as a result of a plurality of low levels within 1 second in the complex composite signal S3 not meeting the signal condition.

In some embodiments, the foregoing "the control module 102 controls the second control chip 114 to perform the light emission mode in place of the first control chip 112 in response to the plurality of low levels of the composite signal S3 within 1 second not meeting the signal condition" may mean that when the composite signal S3 does not meet the signal condition, the control module 102 only adds the single always-on command C1 or the single always-off command C2 to the drive signal S2, so that the generated composite signal S3 only has the single always-on command C1 or the single always-off command C2. Herein, the first control chip 112 may control the second LED 109 to be always on or always off during the light emission mode based on the single always-on command C1 or the single always-off command C2. Then the control module 102 does not output the reset signal S4. The second control chip 114 no longer resets the preset control timing CT before receiving the reset signal S4, so that the third LED 110 performs the specified light emission mode based on the preset control timing CT. The first LED 104 and the second LED 109 may remain always on to enhance the visual effect of the overall multi-modulation string light 100. Alternatively, the first control chip 112 may perform the specified light emission mode, and maybe due to the complexity of the visual effect to be presented in the light emission mode, it may be difficult to add the complex communication command signal S1 to the drive signal S2. The control module 102 may control sending of a switching command to drive the second control chip 114 to perform the specified light emission mode in place of the first control chip 112 (for example, functions such as flickering, breathing, candle flickering, or star-like flickering).

Figure 9:
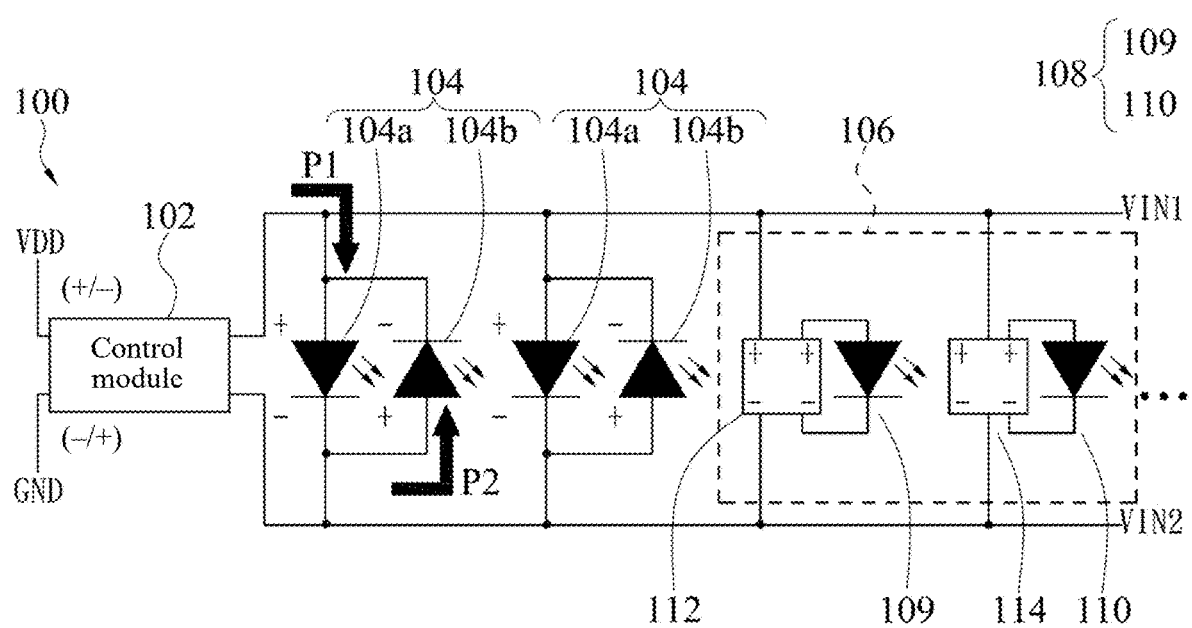
FIG. 9 is a block diagram (I) of a multi-modulation string light according to some other embodiments of the present invention.

As shown in FIG. 9, in some embodiments, a plurality of first LEDs 104 may be arranged. One of the first LEDs 104 has a first turn-on direction P1. Another of the first LEDs 104 has a second turn-on direction P2. The first turn-on direction P1 is opposite to the second turn-on direction P2. For example, a plurality of first LEDs 104 in FIG. 9 are each divided into a first LED 104a and a first LED 104b based on turn-on directions. When the turn-on direction of the first LED 104a is the first turn-on direction P1, the first LED 104a may generate first light based on the drive signal S2, and the first LED 104b does not generate the first light. Conversely, when the turn-on direction of the drive signal S2 is the second turn-on direction P2, the first LED 104*b* may generate the first light based on the drive signal S2, and the first LED 104*a* does not generate the first light. In some embodiments, the first LED (104*a*, 104*b*) may be adapted to drive signals S2 with different turn-on directions. In this way, the first LED 104*a* and the first LED 104*b* may be LEDs of the same color or different colors, thereby generating a visual effect of lights of different colors emitting light in turn.

Figure 10:
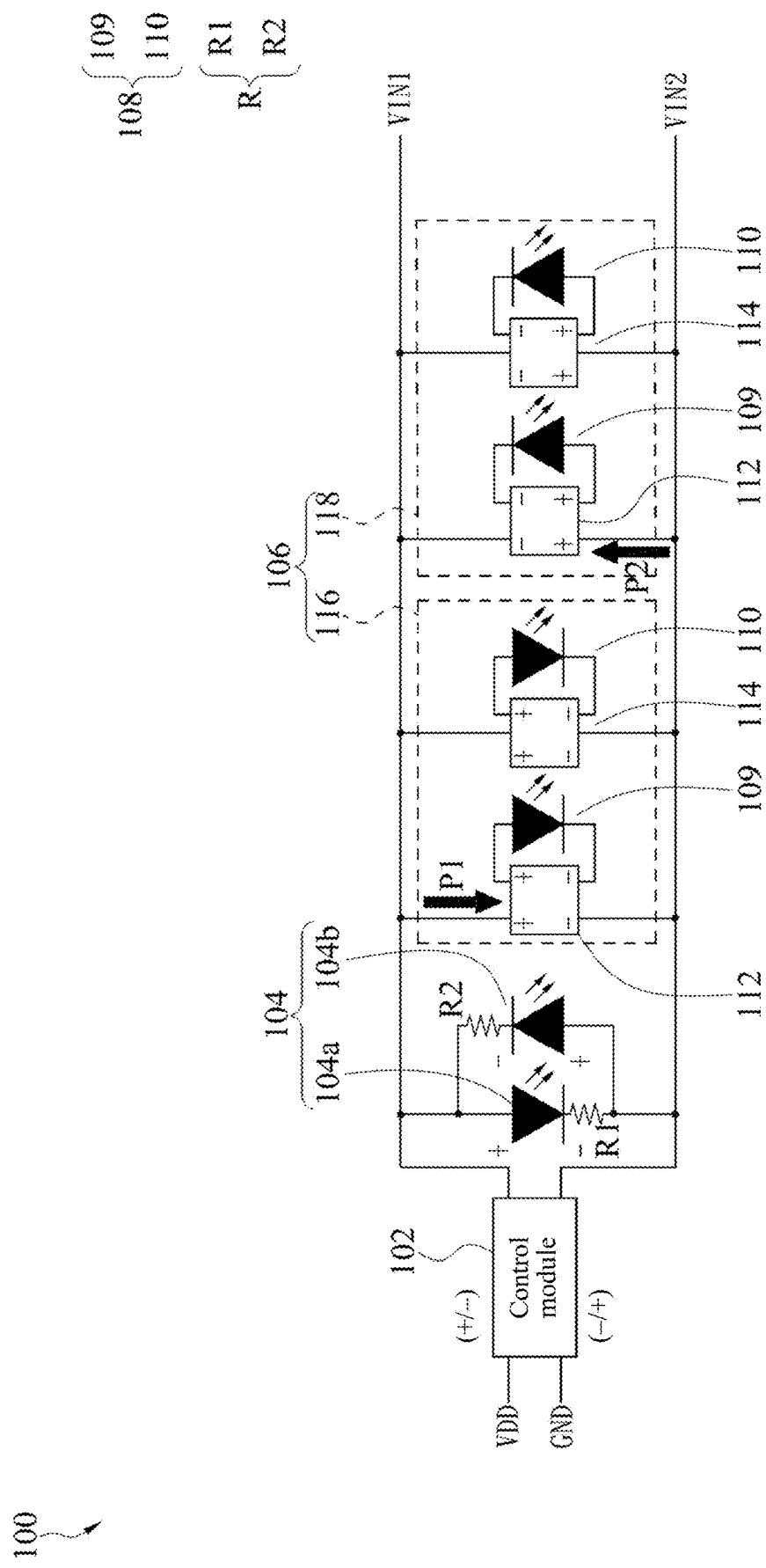
FIG. 10 is a block diagram (II) of a multi-modulation string light according to some other embodiments of the present invention.

As shown in FIG. 10, a plurality of light emitting components 106 are arranged. One of the light emitting components 106 has a first turn-on direction P1. Another of the light emitting components 106 has a second turn-on direction P2. The first turn-on direction P1 is opposite to the second turn-on direction P2. For example, each of the light emitting components 106 in FIG. 10 is divided into a first light emitting component 116 and a second light emitting component 118 based on turn-on directions. When the turn-on direction of the first light emitting component 116 is the first turn-on direction P1, the first light emitting component 116 may generate modulated light based on the communication command signal S1, and the second light emitting component 118 does not generate the modulated light. Conversely, when the turn-on direction of the communication command signal S1 is the second turn-on direction P2, the second light emitting component 118 may generate modulated light based on the communication command signal S1, and the first light emitting component 116 does not generate the modulated light. In this way, the first light emitting component 116 and the second light emitting component 118 may be adapted to communication command signals S1 with different turn-on directions. For example, the first light emitting component 116 and the second light emitting component 118 (for example, which refer to the light emitting component 106 in FIG. 10) may be LEDs of the same color or different colors, thereby generating a visual effect of lights of different colors emitting light in turn.

In some embodiments, the multi-modulation string light 100 further includes a plurality of resistors R (as shown in FIG. 10). One end of each of the resistors R is coupled to the first LED 104, and another end is coupled to one of the first wire VIN1 and the second wire VIN2. For example, in some cases, a voltage of a first input terminal VDD is 3V, and a voltage drop across the first LED 104 may be reduced (for example, reduced to 2.8V) by wire resistance of the first wire VIN1 and the second wire VIN2. The voltage drop inputted into the second LED 109 and the third LED 110 may be reduced to 2.3V by an electronic element (such as an electronic switching element with a voltage drop of 0.7) of the first control chip 112 or the second control chip 114. Therefore, the voltage drops of the first LED 104 and the second LED 109 (or the third LED 110) are not consistent, resulting in a brightness difference between brightness of the first LED 104 and brightness of the second LED 109 in the visual effect. In some embodiments, a resistor R may be arranged for the first LED 104 to adjust the voltage drop of the first LED 104, so that the brightness of the first LED 104, the second LED 109, and the third LED 110 are close to or consistent with each other. In some embodiments, the resistors R include a first resistor R1 and a second resistor R2. One end of the first resistor R1 is coupled to an N terminal of the first LED 104*a*, and the other end is coupled to the second wire VIN2. One end of the second resistor R2 is coupled to an N terminal of the first LED 104*b*, and the other end is coupled to the first wire VIN1. The multi-modulation string light 100 may adjust the voltages of the first LED 104*a* and the first LED 104*b* through the first resistor R1 and the second resistor R2, so that the brightness of the first LED 104*a*, the first LED 104*b*, the first light emitting component 116, and the second light emitting component 118 is visually consistent. In some embodiments, the resistor R may be packaged in the first LED 104, so as not to affect the visual effect of the first LED 104 on the multi-modulation string light 100.

Figure 11:
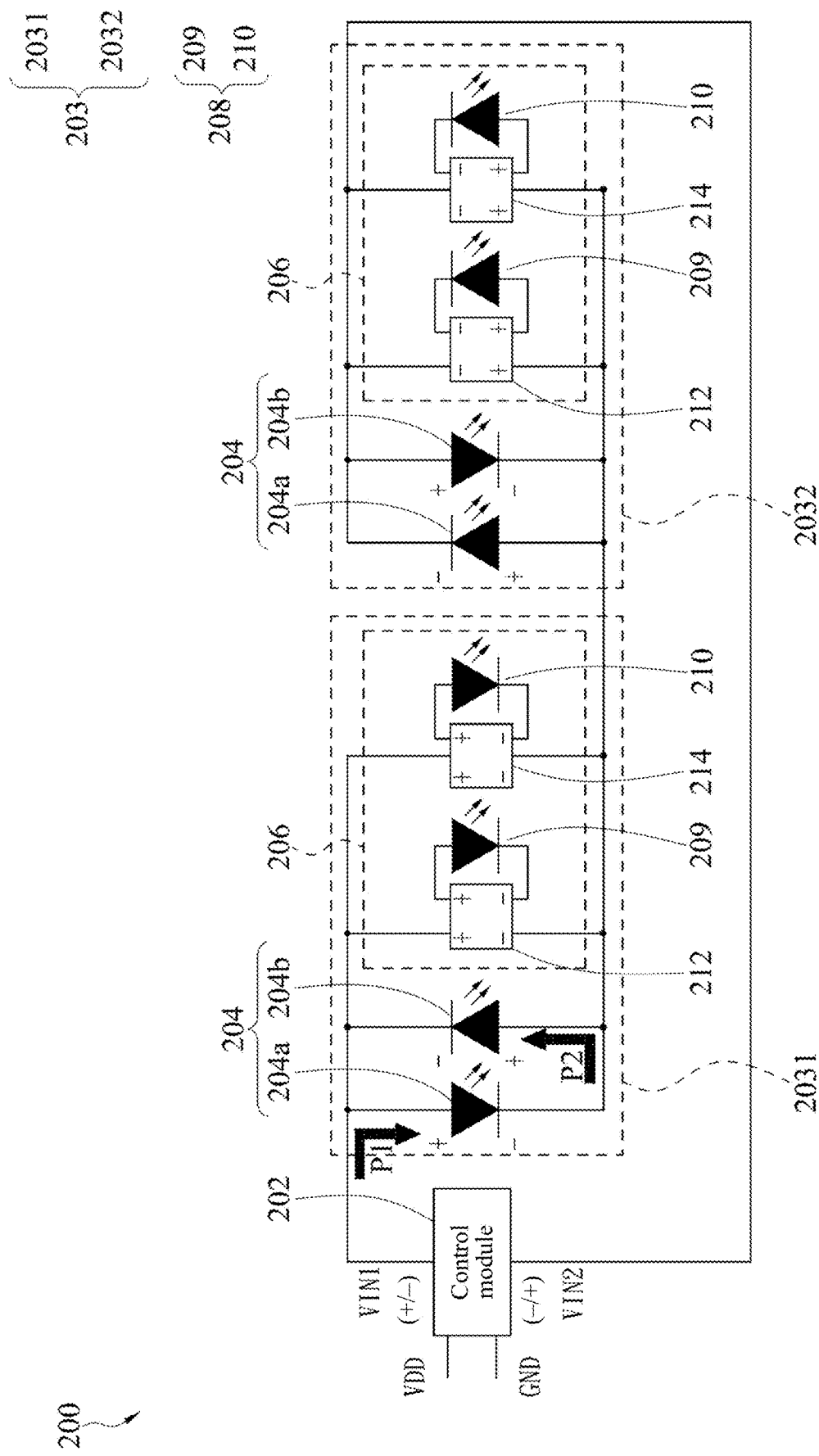
FIG. 11 is a block diagram (III) of a multi-modulation string light according to some other embodiments of the present invention.

As shown in FIG. 11, a multi-modulation string light 200 includes a first wire VIN1, a second wire VIN2, a control module 202, and a plurality of light emitting groups 203. The control module 202 is configured to combine a communication command signal S1 and a drive signal S2 to generate a composite signal S3 and output the composite signal to a first wire VIN1 and a second wire VIN2. The plurality of light emitting groups 203 are connected in series to the control module 202. Each of the light emitting groups 203 includes a plurality of first LEDs 204 and a light emitting component 206. For the control module 202, reference may be made to the description of the control module 102 shown in FIG. 1. For the first LED 204, reference may be made to the description of the first LED 104 shown in FIG. 1. For the light emitting component 206, reference may be made to the description of the light emitting component 106 shown in FIG. 1. The light emitting component 206 further includes an LED set 208, a first control chip 212, and a second control chip 214. The LED set 208 includes a second LED 209 and a third LED 210. Reference may be made to the descriptions of the first LED 104, the LED set 108, the second LED 109, the third LED 110, the first control chip 112, and the second control chip 114 shown in FIG. 1.

In some embodiments, the first LED 204 in FIG. 11 is divided into a first LED 204*a* and a first LED 204*b* based on turn-on directions. When the turn-on direction of the first LED 204*a* is the first turn-on direction P1, the first LED 204*a* may generate first light based on the drive signal S2, and the first LED 204*b* does not generate the first light. Conversely, when the turn-on direction of the drive signal S2 is the second turn-on direction P2, the first LED 204*b* may generate the first light based on the drive signal S2, and the first LED 204*a* does not generate the first light. In some embodiments, polarities of the first LED 204*a* and the first LED 204*b* may be adapted to the drive signal S2 with different turn-on directions.

The foregoing "the light emitting group 203 is connected in series to the control module 202" may mean that the first light emitting group 2031 and the second light emitting group 2032 in FIG. 11 are connected in series in sequence. In addition, the first light emitting group 2031 is coupled to one end of the control module 202, and the second light emitting group 2032 is coupled to the other end of the control module 202, to form a loop. It should be noted that an input voltage of a single light emitting group 203 is 3V. In FIG. 11, the multi-modulation string light 200 has two light emitting groups (2031, 2032) with an input voltage of approximately 9V. An example in which 9 light emitting groups 203 are connected in series with the multi-modulation string light 200 is used. An operating voltage of the 9 light emitting groups 203 is 27V. In consideration of resistance of the first wire VIN1 and the second wire VIN2, the input voltage may be set to 31V, and so on. In some embodiments, the multi-modulation string light 200 may also be connected in series with more than three light emitting groups 203.

Figure 12:
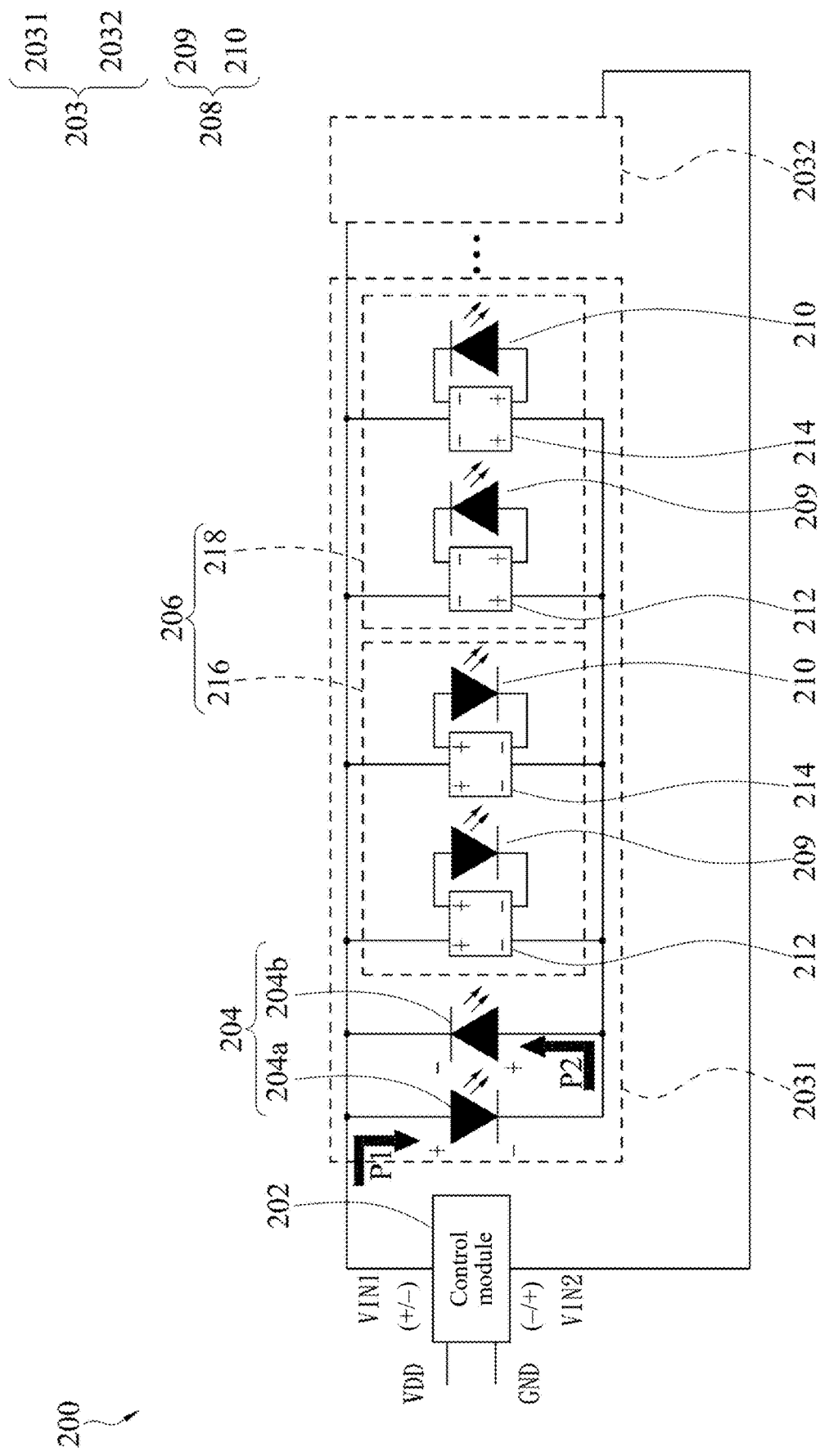
FIG. 12 is a block diagram (IV) of a multi-modulation string light according to some other embodiments of the present invention.

As shown in FIG. 12, a plurality of light emitting components 206 may be arranged. Each of the light emitting components 206 is divided into a first light emitting component 216 and a second light emitting component 218 based on turn-on directions. When the turn-on direction of the first light emitting component 216 is the first turn-on direction P1, the first light emitting component 216 may generate first light based on the communication command signal S1, and the second light emitting component 218 does not generate the first light. Conversely, when the turn-on direction of the communication command signal S1 is the second turn-on direction P2, the second light emitting component 218 may generate first light based on the communication command signal S1, and the first light emitting component 216 does not generate the first light. In this way, the plurality of light emitting groups (2031, 2032) connected in series with the multi-modulation string light 200 may be adapted to the polarity of the communication command signal S1, to control the first light emitting component 216 or the second light emitting component 218 in each light emitting group (2031, 2032) to generate second light. In the embodiment shown in FIG. 12, any light emitting group (2031, 2032) includes first LEDs (204a, 204b) with different turn-on directions and light emitting components 206 (the first light emitting component 216 and the second light emitting component 218) with different turn-on directions. Herein, a communication address of any light emitting group (2031, 2032) may be set separately based on the different light emitting groups (2031, 2032), so that the first light emitting component 216 and the second light emitting component 218 in the group may be controlled through one communication address.

In the embodiment in FIG. 11 or FIG. 12, the control module 202 outputs a composite signal S3 to the first wire VIN1 and the second wire VIN2, so as to simultaneously control the first light emitting group 2031 and the second light emitting group 2032. For example, when the drive signal S2 is at a high potential, the first LEDs 204 in each light emitting group (2031, 2032) may generate first light. When the drive signal S2 is at a low potential, the first LEDs 204 in each light emitting group (2031, 2032) do not generate the first light (which present an off state). For another example, when the communication command signal S1 is a light emitting signal, the first control chip 212 of the light emitting component 206 may drive the second LED 209 to generate modulated light. In this way, the control module 202 outputs a communication command signal S1 once to simultaneously control a plurality group of light emitting groups (2031, 2032), to enhance control performance of the multi-modulation string light 200. Furthermore, in response to the communication command signal S1 exceeding half of a duty cycle of the composite signal S3, the control module 202 may add a reset signal S4 to the communication command signal S1, and does not add the always-on command C1 or the always-off command C2 to the communication command signal S1. In this way, the first control chip 212 does not drive the second LED 209 to generate modulated light, and the second control chip 214 drives the third LED 210 to generate modulated light.

Figure 13:
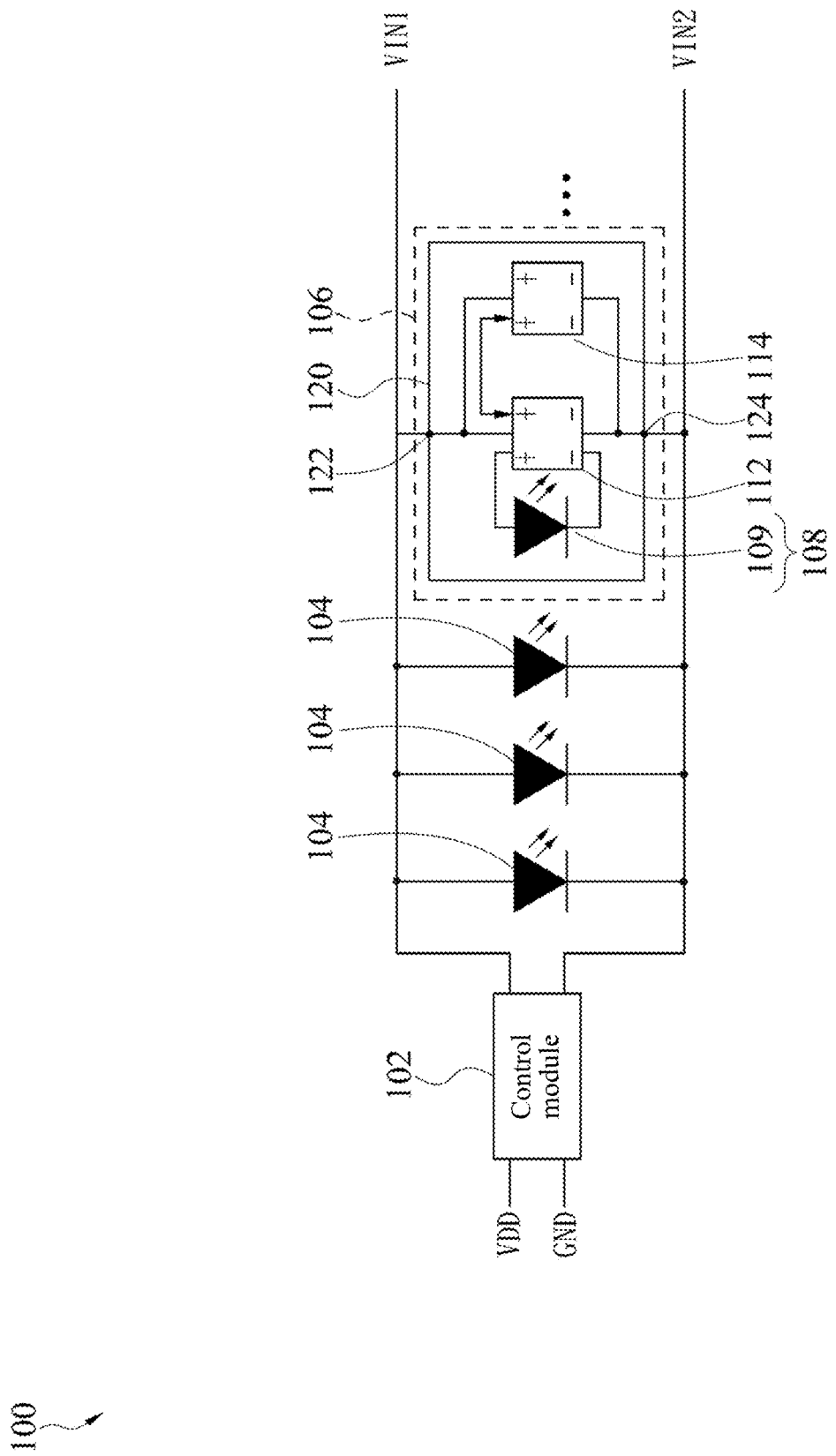
FIG. 13 is a block diagram (V) of a multi-modulation string light according to some other embodiments of the present invention.

As shown in FIG. 13, in some embodiments, the light emitting component further includes a package 120. The LED set 208 includes a second LED 209. The second LED 109, the first control chip 112, and the second control chip 114 are packaged within the package 120. The package 120 has a first electrical connection terminal 122 and a second electrical connection terminal 124. The first electrical connection terminal 122 is coupled to the first wire VIN1 and the first control chip 112. The second electrical connection terminal 124 is coupled to the second wire VIN2 and the first control chip 112. The second control chip 114 is communicatively connected to the first control chip 112. The control module 102 is selectively configured to: continuously generate the composite signal S3 after generating the communication command signal S1 having a master control command, where the first control chip 112 disables the second control chip 114 based on the master control command; or generate the drive signal after generating the communication command signal S1 having a switching command. The first control chip 112 drives the second LED 109 based on a communication from the second control chip 114. Specifically, in response to the composite signal S3 meeting a signal condition (indicating that the composite signal S3 does not affect a visual effect of the first light), the control module 102 continuously generates the composite signal S3 after generating the communication command signal S1 having a master control command. Next, the first control chip 112 disables the second control chip 114 (the first control chip 112 may communicate) through the master control command, and drives the second LED 109 based on the communication command signal S1. Herein, the second LED 109 is driven by the first control chip 112. Furthermore, in response to the composite signal S3 not meeting the signal condition (indicating that the composite signal S3 may affect the visual effect of the first light), the control module 102 generates a drive signal S2 after generating the communication command signal S1 having a switching command. The foregoing "the first control chip 112 drives the second LED 109 based on a communication from the second control chip 114" may mean that the first control chip 112 transmits a switching command to the second control chip 114, so that the second control chip 114 transmits preset control timing CT back to the first control chip 112. Next, in response to the first control chip 112 receiving the preset control timing CT, the first control chip 112 may drive the second LED 109 based on a timing change between a high level and a low level of the preset control timing CT. In other words, in this case, the control module 102 does not add the always-on command C1 and the always-off command C2 to the communication command signal S1, but instead adds the switching command to the communication command signal S1. The switching command may be a series of signals encoded with the high level and the low level. Accordingly, the first control chip 112 and the second control chip 114 packaged together may individually drive the second LED 109 based on conditions, to prevent the second LED 109 from emitting abnormal light as a result of the first control chip 112 and the second control chip 114 simultaneously driving the second LED 109. In some embodiments, the first control chip 112 and the second control chip 114 may also be replaced with a single chip.

Figure 14:
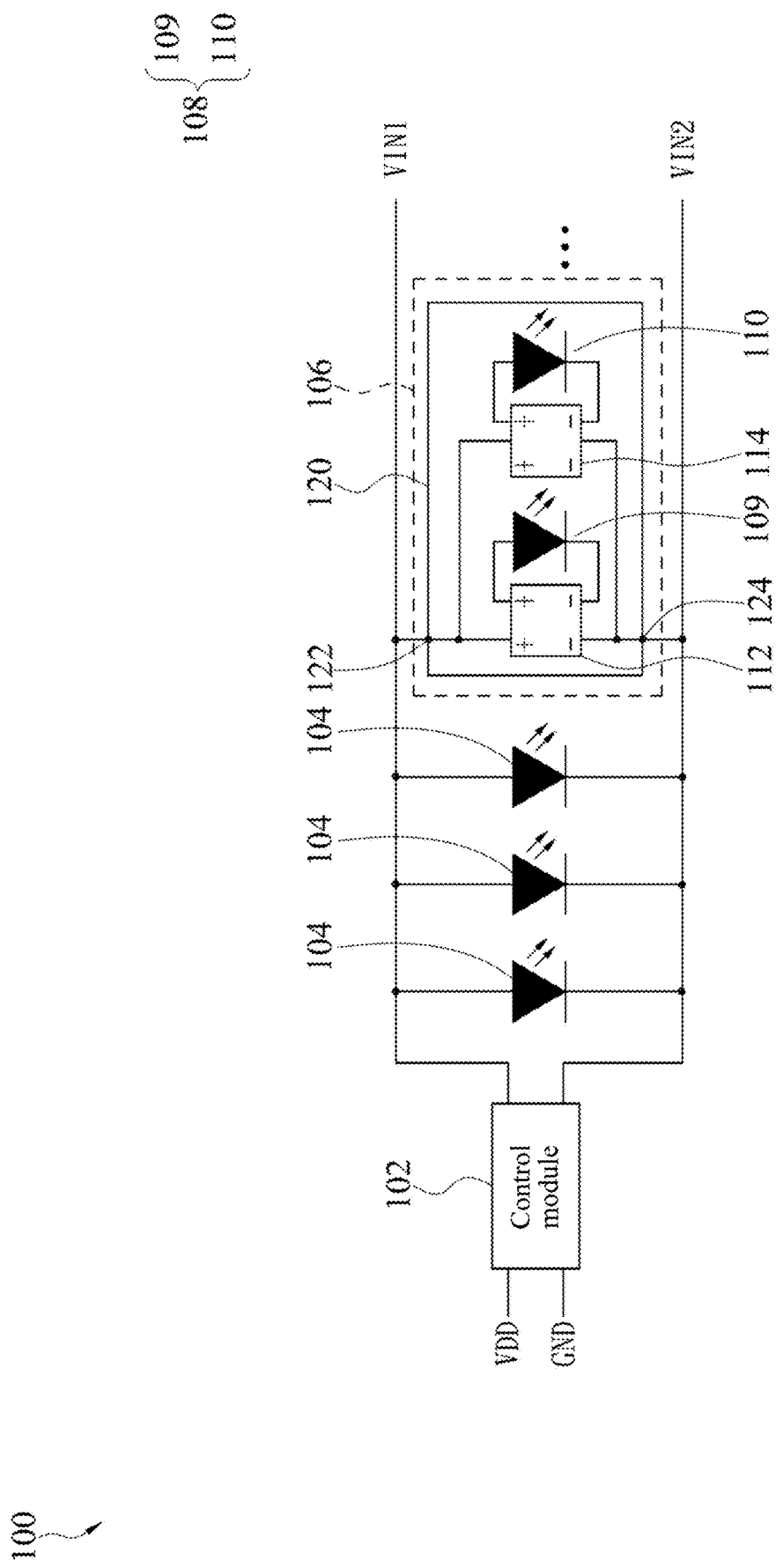
FIG. 14 is a block diagram (VI) of a multi-modulation string light according to some other embodiments of the present invention.

As shown in FIG. 14, in some embodiments, the second LED 109, the third LED 110, the first control chip 112, and the second control chip 114 are packaged within a package 120. The package 120 has a first electrical connection terminal 122 and a second electrical connection terminal 124. The first electrical connection terminal 122 is coupled to the first wire VIN1 and the first control chip 112. The second electrical connection terminal 124 is coupled to the second wire VIN2 and the first control chip 112. The second control chip 114 is communicatively connected to the first control chip 112. The control module is selectively configured to: generate the composite signal S3 having the reset signal S4 that is intermittently sent; or generate the drive signal S2 after generating the communication command signal S1 having the always-on command C1. For example, when the composite signal S3 meets the signal condition, the control module 102 may intermittently generate the reset signal S4. Herein, the first control chip 112 may drive the second LED 109 based on the communication command signal S1. The second control chip 114 may intermittently reset the preset control timing CT based on the reset signal S4, to drive the third LED 110 to be always on. When the composite signal S3 does not meet the signal condition, the control module 102 may generate the communication command signal S1 having the always-on command C1. Herein, the first control chip 112 may drive, based on the always-on command C1, the second LED 109 to be always on. The second control chip 114 may drive, based on the preset control timing CT, the third LED 110 to generate modulated light. Accordingly, when the control module 102 is to execute a complex light emission mode, the first control chip 112 may control the second LED 109 to be always on, and generate modulated light only through the third LED 110. In this way, the complexity of the composite signal S3 is reduced, to avoid abnormal flickering of the first light.

Based on the above, in the multi-modulation string light 100 of some embodiments, the communication command signal S1 and the reset signal S4 may be selectively added to the drive signal S2 through the control module 102, to generate a composite signal S3 and output the composite signal to the first wire VIN1 and the second wire VIN2. When an instruction of the communication command signal S1 is too complex to meet the signal condition (the signal condition includes: a total time length of the low levels does not exceed a first time threshold, and a quantity of the low levels is not less than 10; or the quantity of the low levels is less than 10, and a time length of each of the low levels is not greater than a second time threshold), in this case, the control module 102 may control the first control chip 112 not to perform a light emission mode, but to only drive a portion of the LED set 108 (which may refer to the second LED 109) to be always on or always off. Then the control module 102 controls the second control chip 114 to drive another portion of the LED set 108 (which may refer to the third LED 110) based on the preset control timing CT corresponding to the specified light emission mode, to perform the specified light emission mode in place of the first control chip 112. Accordingly, the first LED 104 may not cause abnormal flickering (for example, the first LED 104 causes irregular flickering or unexpected brightness reduction) as a result of being subject to disturbance of the communication command signal S1.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A multi-modulation string light, comprising:
a first wire;
a second wire;
a control module, configured to selectively combine a communication command signal, a reset signal, and a drive signal to generate a composite signal and output the composite signal to the first wire and the second wire;
a first light emitting diode (LED), connected in parallel between the first wire and the second wire, and configured to generate first light based on the composite signal; and
a light emitting component, connected in parallel between the first wire and the second wire, wherein the light emitting component comprises:
an LED set, configured to generate modulated light when driven;
a first control chip, configured to drive, based on the communication command signal, the LED set to perform a light emission mode; and
a second control chip, configured to drive the LED set based on the drive signal and preset control timing corresponding to the light emission mode, and reset the preset control timing in response to a low level of the communication command signal or in response to the reset signal,
wherein a plurality of low levels of the composite signal within each second meet a signal condition, and the signal condition comprises:
a total time length of the low levels does not exceed a first time threshold, and a quantity of the low levels is not less than 10; or
the quantity of the low levels is less than 10, a time length of each of the low levels is not greater than a second time threshold, and the first time threshold is greater than the second time threshold.

2. The multi-modulation string light according to claim 1, wherein the control module controls the second control chip to perform the light emission mode in place of the first control chip in response to the plurality of low levels of the composite signal within 1 second not meeting the signal condition.

3. The multi-modulation string light according to claim 1, wherein the LED set comprises a second LED and a third LED, the first control chip drives the second LED, and the second control chip drives the third LED.

4. The multi-modulation string light according to claim 1, wherein the communication command signal further comprises an always-on command and an always-off command, and the control module selectively adds the always-on command and the always-off command to the drive signal at a command frequency to generate the composite signal.

5. The multi-modulation string light according to claim 1, wherein the LED set comprises a second LED, the first control chip and the second control chip alternately drive the second LED, and the control module is selectively configured to:
continuously generate the composite signal after generating the communication command signal with a master control command, wherein the first control chip disables the second control chip based on the master control command; or
generate the drive signal after generating the communication command signal with a switching command, wherein the first control chip drives the second LED based on a communication from the second control chip.

6. The multi-modulation string light according to claim 5, wherein the light emitting component further comprises a package, the second LED, the first control chip, and the second control chip are packaged within the package, the package has a first electrical connection terminal and a second electrical connection terminal, the first electrical connection terminal is coupled to the first wire and the first control chip, the second electrical connection terminal is coupled to the second wire and the first control chip, and the first control chip is electrically connected to the second LED and is communicatively connected to the second control chip.

7. The multi-modulation string light according to claim 1, wherein the light emitting component has a light emission address, the communication command signal has a communication address, and the light emitting component generates the modulated light when the light emission address is consistent with the communication address.

8. The multi-modulation string light according to claim 1, wherein the light emitting component further comprises a package, the LED set comprises a second LED and a third LED, the second LED, the third LED, the first control chip, and the second control chip are packaged within the package, the package has a first electrical connection terminal and a second electrical connection terminal, the first electrical connection terminal is coupled to the first wire and the first control chip, the second electrical connection terminal is coupled to the second wire and the first control chip, the first control chip is communicatively connected to the second control chip, and the control module is selectively configured to: generate the composite signal having the reset signal that is intermittently sent; or generate the drive signal after generating the communication command signal having an always-on command.

9. The multi-modulation string light according to claim 1, wherein when a plurality of first LEDs are arranged, one of the plurality of first LEDs has a first turn-on direction, another of the plurality of first LEDs has a second turn-on direction, and the first turn-on direction is opposite to the second turn-on direction.

10. The multi-modulation string light according to claim 1, wherein a plurality of light emitting components are arranged, one of the plurality of light emitting components has a first turn-on direction, another of the plurality of light emitting components has a second turn-on direction, and the first turn-on direction is opposite to the second turn-on direction.

* * * * *